(12) United States Patent
Bidkar et al.

(10) Patent No.: US 10,837,299 B2
(45) Date of Patent: Nov. 17, 2020

(54) SYSTEM AND METHOD FOR TRANSITION PIECE SEAL

(71) Applicant: General Electric Company, Schenectady, NY (US)

(72) Inventors: Rahul Anil Bidkar, Niskayuna, NY (US); Neelesh Nandkumar Sarawate, Schenectady, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 533 days.

(21) Appl. No.: 15/452,458

(22) Filed: Mar. 7, 2017

(65) Prior Publication Data

US 2018/0258782 A1 Sep. 13, 2018

(51) Int. Cl.
*F01D 9/02* (2006.01)
*F01D 11/00* (2006.01)
(Continued)

(52) U.S. Cl.
CPC ............ *F01D 11/003* (2013.01); *F01D 9/023* (2013.01); *F01D 9/041* (2013.01); *F01D 11/005* (2013.01); *F01D 25/243* (2013.01); *F01D 25/30* (2013.01); *F02C 3/14* (2013.01); *F05D 2220/32* (2013.01); *F05D 2230/60* (2013.01); *F05D 2240/35* (2013.01); *F05D 2240/55* (2013.01); *F05D 2240/57* (2013.01)

(58) Field of Classification Search
CPC ...................................................... F01D 9/023
See application file for complete search history.

(56) References Cited

U.S. PATENT DOCUMENTS

| 6,450,762 B1 | 9/2002 | Munshi |
| 6,547,257 B2 | 4/2003 | Cromer |

(Continued)

FOREIGN PATENT DOCUMENTS

| EP | 2 871 326 A1 | 5/2015 |
| EP | 3 124 749 A1 | 2/2017 |
| WO | 01/96712 A1 | 12/2001 |

OTHER PUBLICATIONS

Extended European Search Report issued in connection with corresponding EP Application No. 18160335.8 dated Jul. 11, 2018.

(Continued)

*Primary Examiner* — Craig Kim
*Assistant Examiner* — Alyson Joan Harrington
(74) *Attorney, Agent, or Firm* — Fletcher Yoder, P.C.

(57) ABSTRACT

A system may include a transition piece, coupled to a support of the system, to receive combustion products from a combustion chamber. The system may also include a turbine nozzle, coupled to a support of the system, to receive combustion products from the transition piece. Additionally, a web plate disposed at a radial position about a turbine axis between the transition piece and the turbine nozzle may form a first seal between the web plate and the transition piece and form a second seal between the web plate and the turbine nozzle. In addition, the web plate may extend in a circumferential direction about the turbine axis and couple to a support of the system. Further, the web plate may include an inner surface, an outer surface, and an arm extending in a radial direction between the inner surface and the outer surface.

20 Claims, 10 Drawing Sheets

(51) Int. Cl.
*F01D 25/24* (2006.01)
*F01D 25/30* (2006.01)
*F01D 9/04* (2006.01)
*F02C 3/14* (2006.01)

(56) References Cited

U.S. PATENT DOCUMENTS

| | | | |
|---|---|---|---|
| 6,860,108 | B2 | 3/2005 | Soechting et al. |
| 7,527,469 | B2 | 5/2009 | Zborovsky et al. |
| 7,584,620 | B2 * | 9/2009 | Weaver ............... F01D 9/023 60/39.37 |
| 7,784,264 | B2 | 8/2010 | Weaver et al. |
| 7,797,948 | B2 | 9/2010 | Weaver et al. |
| 7,908,866 | B2 | 3/2011 | Kato et al. |
| 8,001,787 | B2 | 8/2011 | Sutcu et al. |
| 8,118,549 | B2 | 2/2012 | Schiavo |
| 8,142,142 | B2 | 3/2012 | Zborovsky et al. |
| 8,225,614 | B2 | 7/2012 | Lacy et al. |
| 8,347,636 | B2 | 1/2013 | Butkiewicz et al. |
| 8,365,538 | B2 | 2/2013 | Buchal et al. |
| 8,388,307 | B2 | 3/2013 | Smoke et al. |
| 8,491,259 | B2 | 7/2013 | Sutcu |
| 8,511,972 | B2 | 8/2013 | Sutcu |
| 8,534,076 | B2 | 9/2013 | Woodcock et al. |
| 8,562,000 | B2 | 10/2013 | Moehrle et al. |
| 8,661,828 | B2 | 3/2014 | Pieussergues et al. |
| 8,671,585 | B2 | 3/2014 | Sherlock et al. |
| 8,726,626 | B2 | 5/2014 | Spooner |
| 9,115,808 | B2 | 8/2015 | Simmons et al. |
| 2006/0127219 | A1 | 6/2006 | Zborovsky |
| 2006/0288707 | A1 * | 12/2006 | Weaver ............... F01D 9/023 60/796 |
| 2008/0053107 | A1 | 3/2008 | Weaver et al. |
| 2008/0101927 | A1 | 5/2008 | Strain et al. |
| 2009/0115141 | A1 | 5/2009 | Simmons |
| 2010/0115953 | A1 | 5/2010 | Davis, Jr. et al. |
| 2012/0119447 | A1 * | 5/2012 | Demiroglu .......... F01D 9/023 277/637 |

OTHER PUBLICATIONS

Daiber, Paul C.; "Performance and Reliability Improvements for the MS5001 Gas Turbines", Atlanta, GE Power Systems, GER-4196, 2002; pp. 1-39.

* cited by examiner

US 10,837,299 B2

SYSTEM AND METHOD FOR TRANSITION PIECE SEAL

BACKGROUND

The subject matter disclosed herein relates to combustion turbine systems, and more specifically, to combustor and turbine sections of combustion turbine systems.

In a combustion turbine, fuel is combusted in a combustor section to form combustion products, which are directed to a turbine section. The turbine of the turbine section expends the combustion products to drive a load. The combustion products pass through a transition piece of the combustor section to a turbine nozzle of the turbine section. High temperatures and pressures of the combustion products may make sealing difficult. Unfortunately, leakages of oxidant between the combustor section and the turbine section may reduce the efficiency of the combustion turbine system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a system includes a transition piece configured to receive combustion products from a combustion chamber, and the transition piece is coupled to a first support of the system. The system further includes a turbine nozzle configured to receive combustion products from the transition piece, and the turbine nozzle is coupled to a second support of the system. The system further includes a web plate disposed at a radial position about a turbine axis between the transition piece and the turbine nozzle. The web plate is configured to form a first seal between the web plate and the transition piece and the web plate is configured to form a second seal between the web plate and the turbine nozzle. In addition, the web plate extends in a circumferential direction about the turbine axis and the web plate is coupled to a third support of the system. Further, the web plate includes an inner surface, an outer surface, and an arm extending in a radial direction between the inner surface and the outer surface.

In one embodiment, a system includes a web plate disposed at a radial position about a turbine axis between a transition piece and a turbine nozzle. The web plate includes an inner surface, an outer surface, a first arm, and a second arm. The inner surface extends in a circumferential direction about the turbine axis. The outer surface extends in a circumferential direction about the turbine axis. The first arm extends in a radial direction between the inner surface and the outer surface. The second arm extends in the radial direction between the inner surface and the outer surface. In addition, the inner surface, the outer surface, the first arm, and the second arm form a passage between the transition piece and the turbine nozzle. Further, the web plate is configured to form a first seal between the web plate and the transition piece and the web plate is configured to form a second seal between the web plate and the turbine nozzle. The passage is configured to facilitate a flow of combustion products from the transition piece to the turbine nozzle.

In one embodiment, a method includes forming a first seal between a web plate and a transition piece, and the first seal extends around a passage configured to receive a combustion gas. The method further includes forming a second seal between the web plate and a turbine nozzle, and the second seal extends around the passage configured to receive the combustion gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
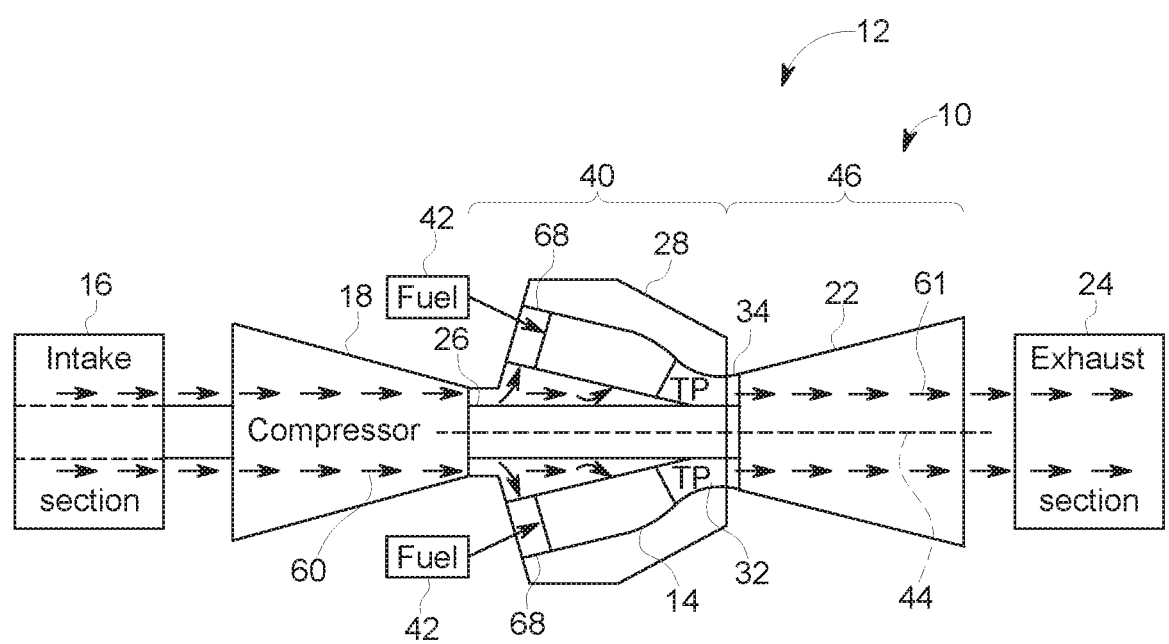
FIG. 1 is a diagram of an embodiment of a gas turbine system.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Combustion products (e.g. exhaust gas) directed from a combustor to a turbine may pass through a transition piece and a turbine nozzle. The transition piece and the turbine nozzle may be separate components. Forces from thermal effects (e.g. thermal expansion and contraction) and the velocity and pressure of the flow combustion products may act on transition piece and turbine nozzle. Because the transition piece and turbine nozzle may not be one part, a gap may allow for some combustion products to pass through. Leakages of oxidant may reduce the efficiency of the system or reduce the load driven by the system. Therefore, it is desirable for seals to reduce or eliminate leakages from occurring to increase the efficiency of the combustion turbine system (e.g. gas turbine system).

Accordingly, embodiments of the present disclosure generally relate to a system and method for reducing or eliminating a leak between the transition piece and the turbine nozzle. That is, some embodiments include a web plate disposed between the transition piece and the turbine nozzle, where the web plate forms one or more seals. The web plate may include a first sealing element between the transition piece and the web plate and a second sealing element between the turbine nozzle and the web plate. The first sealing element and the second sealing element may include any kind of suitable seal, including, but not limited to, a cloth seal, a laminated cloth seal, a leaf seal, a spline seal, a rope seal, a bellow seal, a w-seal, and a hula seal. Further, the sealing elements may form continuous seals about substantially the entire (e.g., greater than 90%) interface between the transition piece and the web plate or the web plate and the turbine nozzle. Forming a seal about substantially the entire interface between the transition piece and the web plate may reduce or eliminate leakage at the corners of the interface.

With the foregoing in mind, FIG. 1 is a block diagram of an example of a gas turbine system 10 that includes a gas turbine engine 12 having a combustor 14 and a turbine 22. In certain embodiments, the gas turbine system 10 may be all or part of a power generation system. In operation, the gas turbine system 10 may use liquid or gas fuel 42, such as natural gas and/or a hydrogen-rich synthetic gas, to run the gas turbine system 10. In FIG. 1, oxidant 60 (e.g. air) enters the system at an intake section 16. The compressor 18 compresses oxidant 60. The oxidant 60 may then flow into compressor discharge casing 28, which is a part of a combustor section 40. The combustor section 40 includes the compressor discharge casing 28, the combustor 14, and a transition piece 32.

Fuel nozzles 68 inject fuel 42 into the combustor 14. For example, one or more fuel nozzles 68 may inject a fuel-air mixture into the combustor 14 in a suitable ratio for desired combustion, emissions, fuel consumption, power output, and so forth. The oxidant 60 may mix with the fuel 42 in the fuel nozzles 68 or in the combustor 14. The combustion of the fuel 42 and the oxidant 60 may generate the hot pressurized exhaust gas (e.g., combustion products 61). The combustion products 61 pass into the turbine 22 via a passage of the transition piece 32 and a turbine nozzle 34. The combustor section 40 may have multiple combustors 14 and transition pieces 32. For example, the combustors 14 and transition pieces 32 may be disposed circumferentially about a turbine axis 44. Embodiments of the gas turbine engine 12 may include 1, 2, 3, 4, 5, 6, 7, 8, 9, 10, 11, or 12 or more combustors 14 and transition pieces 32.

A turbine section 46 includes the turbine 22 that receives the combustion products 61 through one or more turbine nozzles 34. Each turbine nozzle 34 may correspond to a respective transition piece 32 disposed about the axis 44. The combustion products 61 may drive one or more turbine blades within the turbine 22. For example, in operation, the combustion products 61 (e.g., the exhaust gas) flowing into and through the turbine 22 may flow against and between the turbine blades, thereby driving the turbine blades into rotation. The turbine blades are coupled to a shaft 26 of the gas turbine engine 12, which also rotates. In turn, the shaft 26 drives a load, such as an electrical generator in a power plant. The shaft 26 lies along the turbine axis 44 about which turbine 22 rotates. The combustion products 61 exit the turbine 22 through an exhaust section 24.

Figure 2:
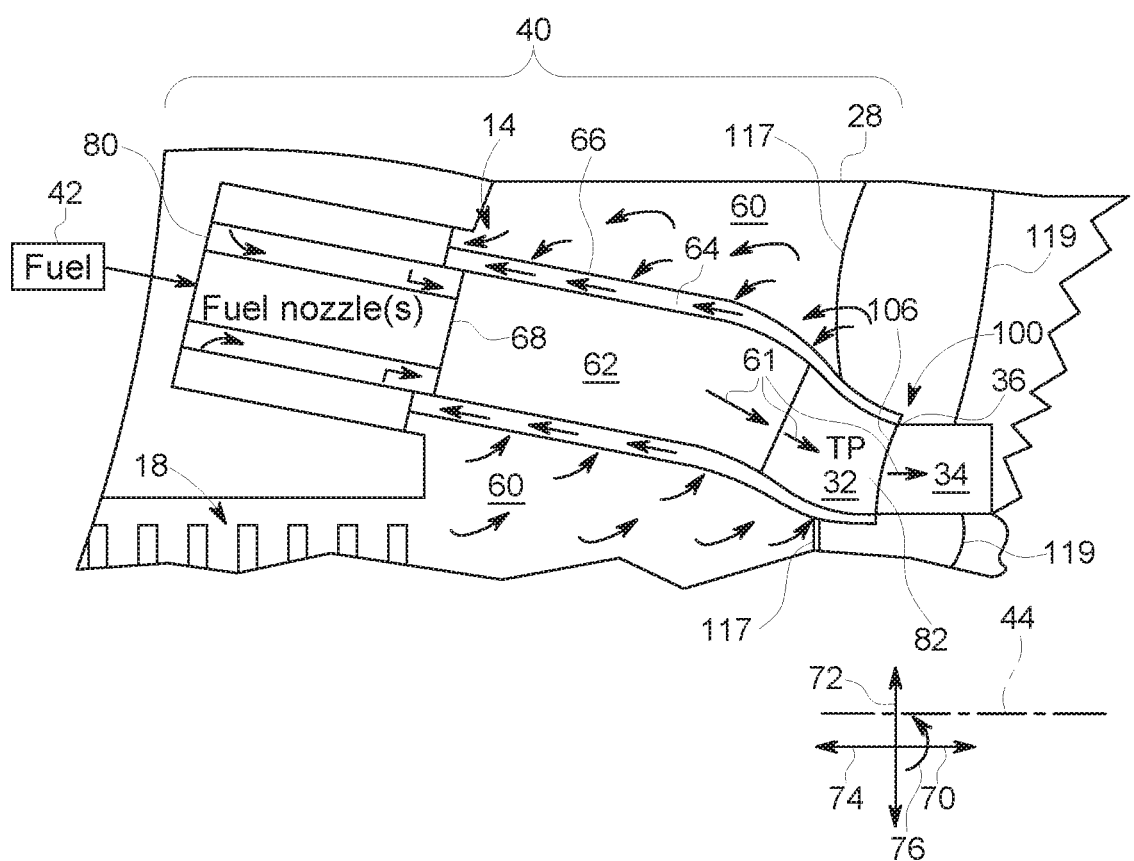
FIG. 2 is a diagram of an embodiment of a combustor section and a turbine section of the system of FIG. 1.

FIG. 2 is a diagram of an embodiment of the combustor section 40 that includes various features described in FIG. 1. As discussed herein, a downstream direction is indicated by arrow 70, a radial direction is indicated by arrow 72, an upstream direction is indicated by arrow 74, and a circumferential direction is indicated by arrow 76. As described in FIG. 1, oxidant 60 exits from the compressor 18 and enters into the compressor discharge casing 28. The oxidant 60 may include air, oxygen, oxygen-enriched air, oxygen-reduced air, or oxygen nitrogen mixtures.

In the present embodiment, the oxidant 60 passes from the compressor discharge casing 28 into a passage 64, which is formed by the cavity separating a combustion chamber 62 and a sleeve 66. In some embodiments, the oxidant 60 may flow directly from the compressor discharge casing 28 into a combustion head 80. The flow of oxidant 60 through the passage 64 may cool the combustion chamber 62, the transition piece 32, and/or a web plate 36. That is, the oxidant 60 may flow in the upstream direction 74 through the passage 64 toward the combustion head 80, or in the downstream direction 70 toward the web plate 36 and turbine nozzle 34. It should be appreciated that the combustion chamber 62 may be part of a single piece that includes the transition piece 32. Alternatively, the combustion chamber 62 and the transition piece 32 may be separate from one another. The web plate 36 is part of a system for sealing between the transition piece 32 and the turbine nozzle 34. The web plate 36 is described in greater detail below. After flowing in the upstream direction 74 through the passage 64, the oxidant 60 may flow into the combustion head 80. From there, the oxidant 60 flows into the combustion chamber 62. In some embodiments, portions of the oxidant 60 may flow into the combustion chamber 62 from the passage 64 as a diluent and/or cooling flow.

Fuel 42 is injected into the combustion chamber 62 through a fuel nozzle 68. In the illustrated example, the oxidant 60 mixes with the fuel 42 inside the combustion chamber 62; however, in alternative embodiments, the fuel 42 and the oxidant 60 may mix at any suitable location, including inside the fuel nozzle 68. The mixture of the oxidant 60 and the fuel 42 then combusts in the combustion chamber 62. The combustion products 61 flow in the downstream direction 70 through a passage 82 of the transition piece 32, the web plate 36, and the turbine nozzle 34. It should be appreciated that the gas turbine engine 12 could include a plurality of combustors 14, transition pieces 32, and turbine nozzles 34 disposed in the circumferential direction 76 about the turbine axis 44. Each combustor 14 may include similar structure (e.g., fuel nozzle 68, flow sleeve 66) as described above. A first support 117 may support or hold in place one or more of the transition pieces 32. A second support 119 may support or hold in place one or more of the turbine nozzles 34.

Figure 3:
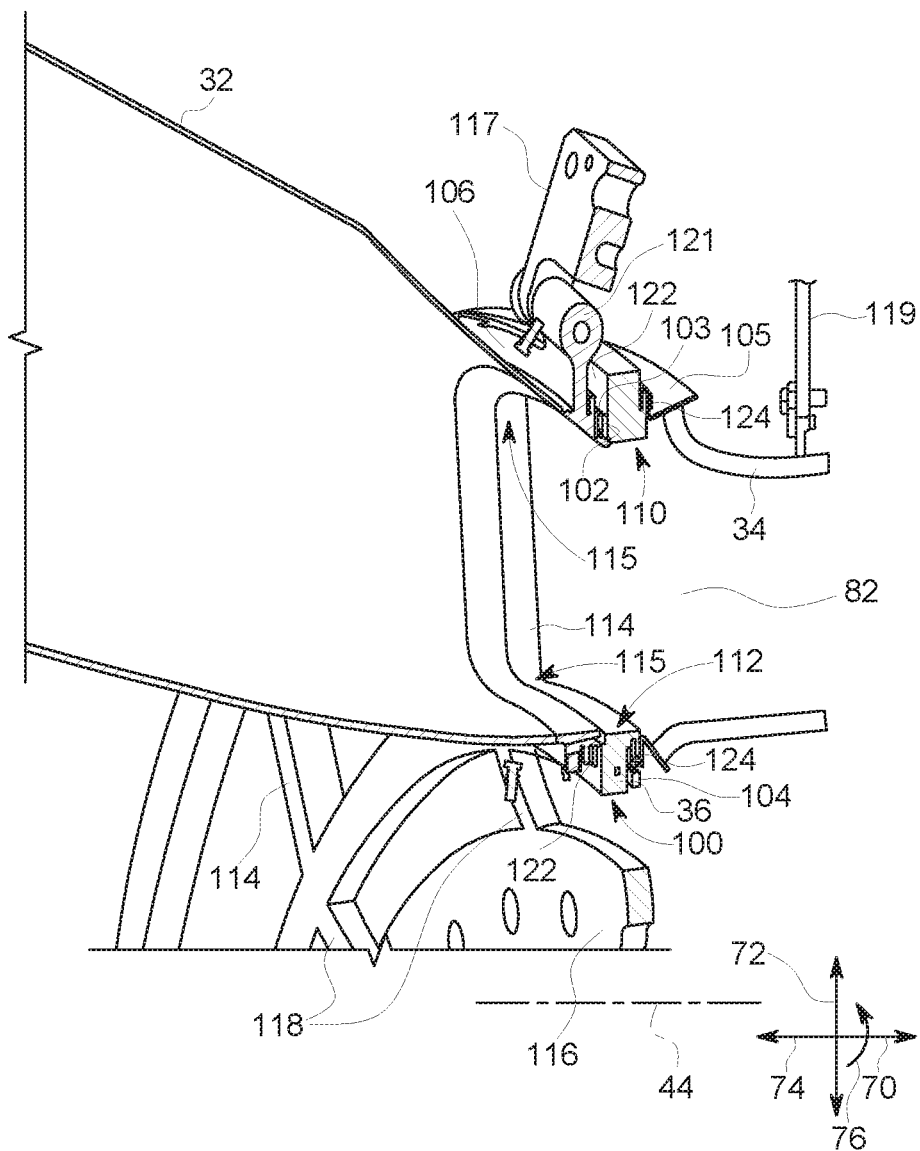
FIG. 3 is a perspective view of an embodiment of a transition piece of the combustion section and a turbine nozzle of the turbine section of the system of FIG. 2.

FIG. 3 is a diagram of an embodiment of a seal system 100 between the transition piece 32 and the turbine nozzle 34 that reduces or eliminates the leakage of the oxidant 60 into the passage 82. As discussed previously, the combustion products 61 flow in a downstream direction 70 through the passage 82 of the transition piece 32 and the turbine nozzle 34. The seal system 100 is disposed between the transition piece 32 and the turbine nozzle 34. In some embodiments, the web plate 36, a first sealing element 102, a second sealing element 104, and an aft frame 106 form the seal system 100.

The web plate 36 is disposed between the transition piece 32 and the turbine nozzle 34. With the web plate 36, there are two interfaces between the transition piece 32 and the turbine nozzle 34. The first interface is between the transition piece 32 and the web plate 36 and the second interface is between the web plate 36 and the turbine nozzle 34. The first sealing element 102 is utilized to form a first seal 103 at the interface between the transition piece 32 and the web plate 36. In some embodiments, the transition piece 32 may include the aft frame 106. The aft frame 106 is disposed between the transition piece 32 and the web plate 36. The aft frame 106 may be integral with the transition piece 32 or coupled by a fastener (e.g. a bolt, a pin, a weld) to the transition piece 32. In embodiments including the aft frame 106, the first sealing element 102 forms the first seal 103 at the interface between the aft frame 106 and the web plate 36. The first sealing element 102 extends in the circumferential direction 76 along the web plate 36 and may extend continuously about the passage 82, or any fraction about the passage 82, including 25%, 50%, 75%, or 100%. The first sealing element 102 may be disposed on an upstream face 122 of the web plate 36 between the transition piece 32 and the web plate 36. The upstream face 122 may be a part of the radially outer surface 110, the radially inner surface 112, the radial arms 114, or any combination thereof. One or more radial arms 114 of the web plate 36 extend in the radial direction 72 between a radially outer surface 110 and a radially inner surface 112. In some embodiments, the first sealing element 102 may extend continuously along the web plate 36 around corners 115 of the passage 82 from the radially outer surface 110 to the radial arm 114, continuously along the web plate 36 from the radially inner surface 112 to the radial arm 114, or any combination thereof. Embodiments of a continuous first sealing element 102 around the corners 115 of the passage 82 may reduce or eliminate leakage of oxidant 60 at the first seal 103. The first sealing element 102 may be along only the radially inner surface 112, only the radially outer surface 110, only the radial arm 114, or along any combination of the radially inner surface 112, the radially outer surface 110, and the one or more radial arms 114 about the passage 82.

The second sealing element 104 is disposed at the interface between the web plate 36 and the turbine nozzle 34 to form a second seal 105. The second sealing element 104 extends in the circumferential direction 76 along the web plate 36 and may extend continuously about at least one of the turbine axis 44 or the passage 82 or any fraction about the at least one of the turbine axis 44 or the passage 82, including 25%, 50%, 75%, or 100%. The second sealing element 104 may be disposed on a downstream face 124 of the web plate 36 between the web plate 36 and the turbine nozzle 34. The downstream face 124 may be a part of the radially outer surface 110, the radially inner surface 112, the radial arms 114, or any combination thereof. In some embodiments, the second sealing element may extend continuously along the web plate 36 around corners 115 of the passage 82 from the radially outer surface 110 to the radial arm 114, continuously along the web plate 36 from the radially inner surface 112 to the radial arm 114, or any combination thereof. Embodiments of a continuous second sealing element 104 around the corners 115 of the passage 82 may reduce or eliminate leakage of oxidant 60 at the second seal 105. The second sealing element 104 may be along only the radially inner surface 112, only the radially outer surface 110, only the radial arm 114, or along any combination of the radially inner surface 112, the radially outer surface 110, and the one or more radial arms 114 about the passage 82.

The web plate 36 includes the radially inner surface 112, the radially outer surface 110, and at least one radial arm 114 extending in the radial direction 72 from the radially inner surface 112 to the radially outer surface 110. Accordingly, the radial arm 114 couples the radially inner surface 112 to the radially outer surface 110. The radially inner surface 112, the radially outer surface 110, and two opposing radial arms 114 may form the passage 82. The passage 82 may include multiple passages 82 that are circumferentially distributed about the turbine axis 44.

FIG. 3 depicts the web plate 36 extending in a circumferential direction 76 about the turbine axis 44. Some embodiments of the web plate 36 may extend circumferentially around 25%, 50%, 75%, or 100% of the turbine axis 44. Some embodiments may include multiple web plates 36 disposed circumferentially about the turbine axis 44 and each web plate 36 may extend in the circumferential direction 76 around 10%, 20%, 30%, 40%, or 50% of the turbine axis 44. Embodiments that include multiple web plates may each include multiple passages 82. It should be noted that each passage 82 may correspond to a respective transition piece 32 and a respective turbine nozzle 34. In some embodiments, each passage 82 could fluidly couple one transition piece 32 to multiple turbine nozzles 34. Alternatively, the passage 82 could fluidly couple multiple transition pieces 32 to one turbine nozzle 34. Web plates 36 that extend in the circumferential direction 76 around a portion of the turbine axis 44 may couple to a corresponding portion of the total number of transition pieces 32 and turbine nozzles 34 the gas turbine engine 12.

FIG. 3 also depicts the web plate 36 coupled to a web plate support 116. The web plate support 116 extends from the web plate 36 in a radial direction 72 towards a central section of the gas turbine engine 12. The web plate support 116 may couple to additional structure (e.g. bearings, the compressor discharge casing 28, an inner turbine shell, an inner support ring) of the gas turbine engine 12.

It should be noted that the web plate support 116 may extend in any suitable direction, including in the radial direction 72 away from the center of the gas turbine engine 12 or at any angle in relation to the radial direction (e.g. 10, 20, 30, 40, 50, or 60 degrees). The web plate support 116 may couple to any suitable structure, including the compressor discharge casing 28, the first support 117, the second support 119, an inner turbine shell, or an inner support ring. Web plate 36 may be coupled to web plate support 116 in any suitable manner, including welding or bolting the web plate 36 and the web plate support 116 to one another. Alternatively, the web plate 36 and the web plate support 116 may be integral with one another. Further, web plate support 116 may be rigidly coupled to web plate 36 by arms 118 that extend from the web plate 36 to the web plate support 116. Alternatively, the arms 118 may extend from the web plate support 116 to the web plate 36. The web plate support 116 could include any number of arms 118, including 1, 2, 3, 4, 5, 6, or more. Further, the web plate support 116 extends in the circumferential direction 76 about the turbine axis 44 and may extend in the circumferential direction 76 to any fraction about the turbine axis 44, including 25%, 50%, 75%, or 100%. For example, the web plate support 116 may be configured to support 1, 2, 3, 4, 5, or 6 or more web plates 36 disposed about the turbine axis 44.

The web plate support 116 may also support the transition piece 32 and/or the turbine nozzle 34. However, it should be appreciated that the transition piece 32 may couple to the first support 117. It should be appreciated that the turbine nozzle 34 may couple to the second support 119. The first support 117 and the second support 119 may include structure similar to the web plate support 116, with a member extending circumferentially and arms coupling the member. Alternative embodiments of the structure could include rigid arms extending towards other members of the gas turbine engine 12. The first support 117 and the second support 119 may extend towards and couple to other members of the gas turbine engine 12, including the compressor discharge casing 28, additional structure (e.g. bearings, the compressor discharge casing 28, an inner support ring, an inner turbine shell) toward the central section of the gas turbine engine 12, or the web plate support 116. The first support 117 may couple to the transition piece 32 at a hooking element 121.

Figure 4:
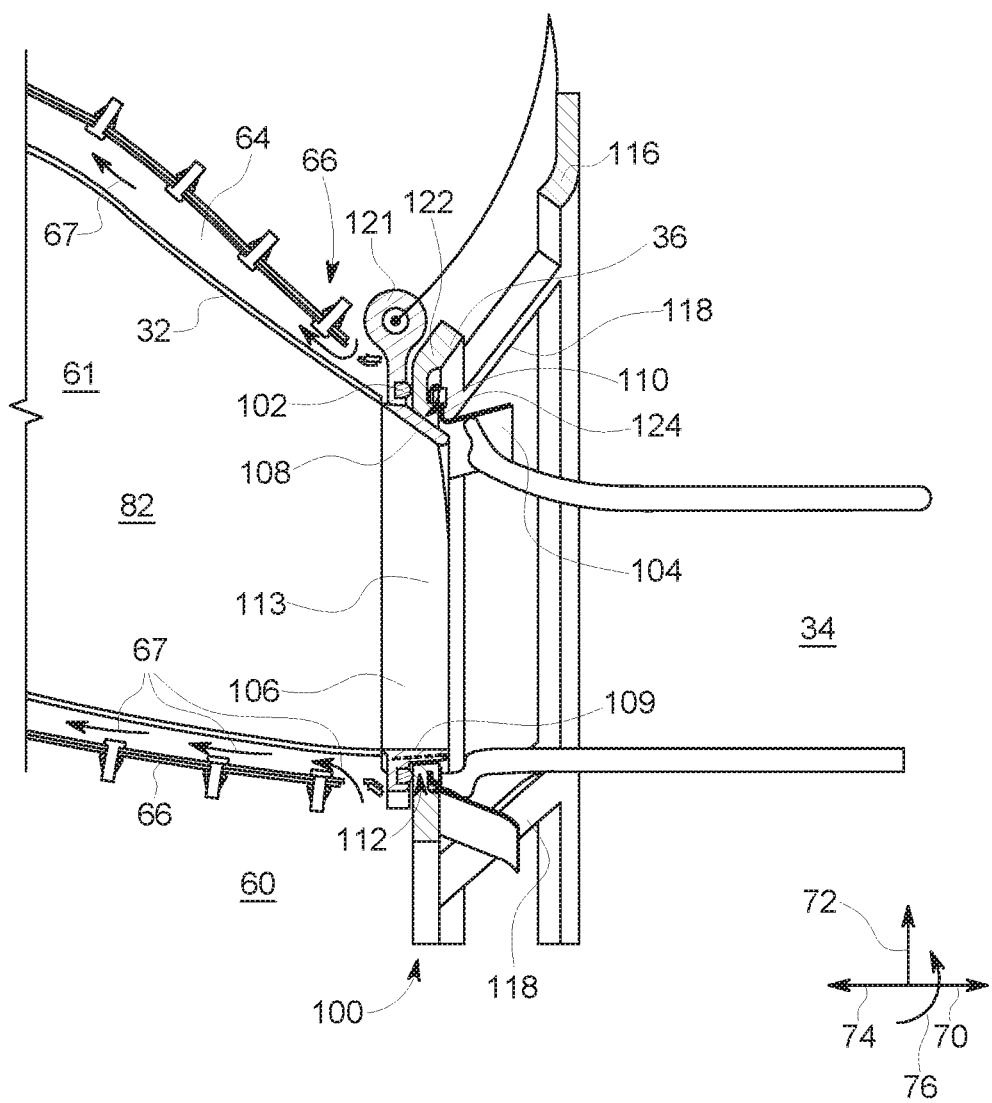
FIG. 4 is a side view of an embodiment of the transition piece, a web plate, and the turbine nozzle.

FIG. 4 is a side view of the seal system 100. The passage 64 is shown disposed between the transition piece 32 and the sleeve 66. The passage 64 allows oxidant 60 to flow in the upstream direction 74 along a path 67. The path 67 is the path oxidant 60 follows to travel from the compressor discharge casing to the combustion head 80. The oxidant 60 flowing on the path 67 begins in the compressor discharge casing. From there, the oxidant 60 flows along the path to the passage 64 and into the combustion head 80. While flowing along the path 67, portions of the oxidant 60 may come into contact with a surface of the transition piece 32, the aft frame 106 and/or, in some embodiments, the web plate 36. Combustion products 61 may also come into contact with a different surface of the transition piece 32, the aft frame 106, and the web plate 36. Because the oxidant 60 tends to be at a lower temperature than the combustion products 61, the oxidant 60 may provide cooling to the transition piece 32, the aft frame 106, the web plate 36, or any combination thereof.

In the present embodiment, the aft frame 106 includes an outer flange 108 that is radially disposed between the radially outer surface 110 and the flow of combustion products 61 through the passage 82. Aft frame 106 includes an inner flange 109 that is disposed between the radially inner surface 112 and the flow of combustion products 61 through the passage 82. Aft frame 106 also includes a radial flange 113 that is disposed between the radial arm 114 and the flow of combustion products 61 through the passage 82. Although in alternative configurations, aft frame 106 may include the outer flange 108, the inner flange 109, the radial flange 113, or any combination thereof. The outer flange 108, the inner flange 109, and the radial flange 113 of the aft frame 106 may protect the web plate 36 from the heat of the combustion products 61. In some embodiments, the outer flange 108, the inner flange 109, and the radial flange 113 may be part of or integral with the transition piece 32.

FIG. 4 illustrates the first sealing element 102 with a rope seal, but it should be appreciated that the first sealing element 102 may include any suitable seal, including a bellow seal, a w-seal, a hula seal, or a spline seal. FIG. 4 illustrates the second sealing element 104 with a cloth seal. However, the second sealing element 104 may include any suitable seal, including a laminated cloth seal, a leaf seal, a feather seal, a strip seal, a spline seal, a shim seal, or any other flexible seal. The first sealing element 102 is in the upstream direction 74 from the web plate 36, and the second sealing element 104 is in the downstream direction 70 from the web plate 36.

In the present embodiment, the web plate support 116 extends outwardly in the radial direction 72. The web plate support 116 may also extend in the circumferential direction 76 about the turbine axis 44 and may extend circumferentially to any fraction about the turbine axis 44, including 25%, 50%, 75%, or 100%. The web plate support 116 includes arms 118 that extend from the web plate support 116 to the web plate 36 and the arms 118 couple to the web plate 36. The web plate support 116 may include any number of arms, including 1, 2, 3, 4, 5, or 6 or more. The web plate support 116 couples to the compressor discharge casing 28. However, as depicted in FIG. 3, web plate support 116 may couple to any suitable location, such as an inner section of the compressor discharge casing 28, an inner turbine shell, or an inner support ring. Further, the first support 117 may couple to the transition piece 32 at the hooking element 121, and the first support 117 may couple to the web plate support 116 by any suitable means, such as welding or bolting.

Figure 5:
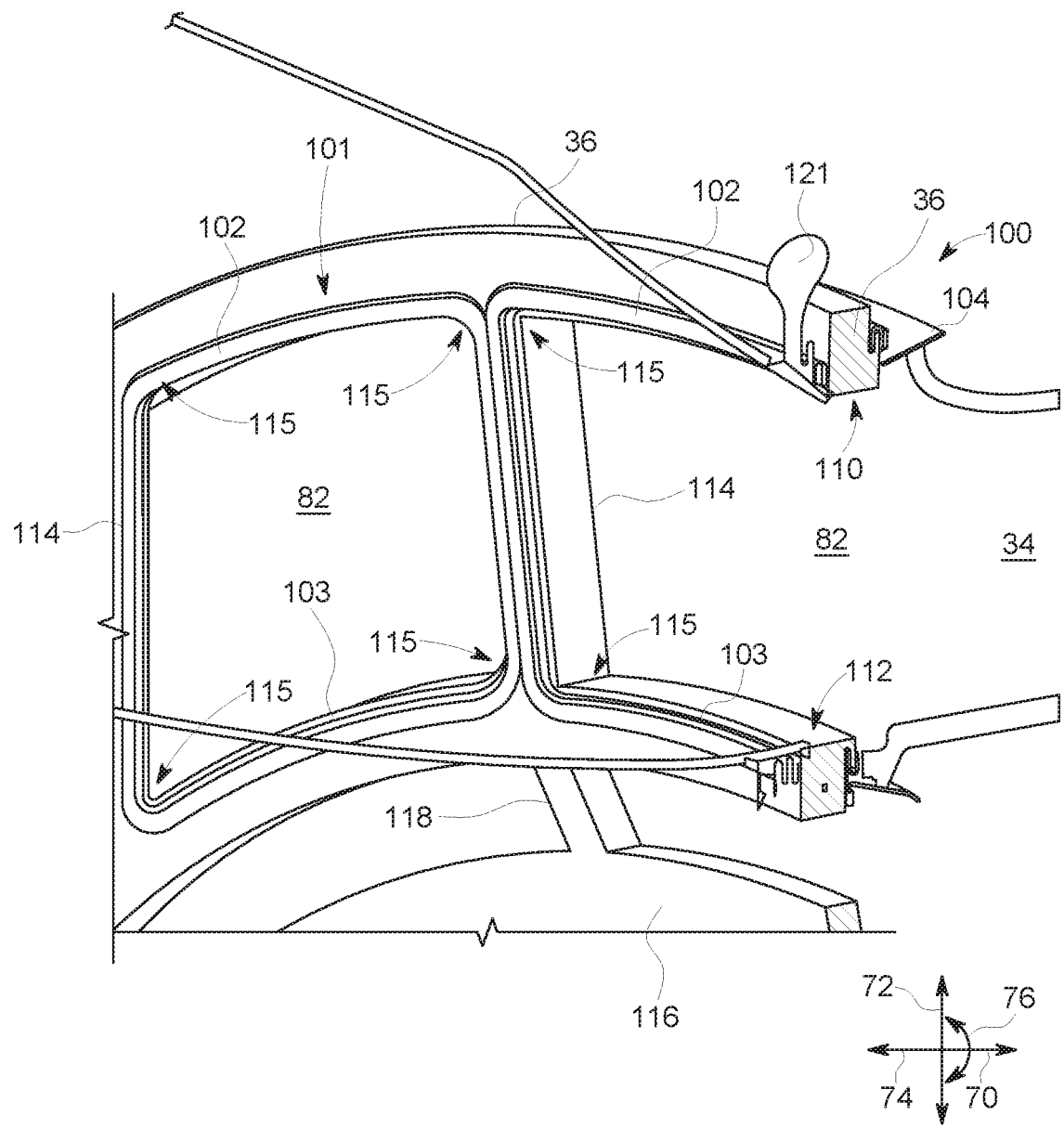
FIG. 5 is a perspective view of the system of FIG. 4, illustrating an embodiment of seals within the web plate.

FIG. 5 is a perspective view detailing the structure of the first sealing element 102 of the seal system 100. The seal system 100 may include the first sealing element 102 and the second sealing element 104. The first sealing element 102 forms the first seal 103 between the web plate 36 and the transition piece 32. The second sealing element 104 forms the second seal 105 between the web plate 36 and the turbine nozzle 34.

The first sealing element 102 may be a continuous seal around a section 101 of the web plate 36 that includes the radially inner surface 112, the radially outer surface 110, and two radial arms 114. The section 101 forms the passage 82. It should be noted that the web plate 36 may include only one section 101 or multiple sections 101. For example, the web plate could have 1, 2, 3, 4, 5, or 6 or more sections 101. The first sealing element 102 may be disposed along only a portion of the section 101. For example, the first sealing element 102 may be disposed along the radially inner surface 112, the radially outer surface 110, one radial arm 114, two radial arms 114, or any combination thereof. Further, each section 101 of the web plate 36 may include a different first sealing element 102. The first sealing element 102 may include multiple first sealing elements 102 disposed along any combination of the radially inner surface 112, the radially outer surface 110, and the radial arms 114. For example, each of the multiple first sealing elements 102 may extend continuously along the web plate 36 around corners 115 of the passage 82 from the radially outer surface 110 to the radial arm 114, continuously along the web plate 36 from the radially inner surface 112 to the radial arm 114, or any combination thereof. In the present embodiment, the first sealing element 102 may be continuous and extend in a circumferential direction 76 to any fraction about the section 101, including 25%, 50%, 75%, or 100%.

The second sealing element 104 may be a continuous seal around the section 101. The second sealing element 104 may be disposed along only a portion of the section 101. Further, the second sealing element 104 may be disposed along only a single section 101 or any suitable number of sections 101, including 1, 2, 3, 4, 5, 6, or more. The second sealing element 104 may be disposed along only a portion of the section 101. For example, the second sealing element 104 may be disposed along the radially inner surface 112, the radially outer surface 110, one radial arm 114, two radial arms 114, or any combination thereof. Further, each section 101 of the web plate 36 may include a different second sealing element 104. The second sealing element 104 may include multiple second sealing elements 104 disposed along any combination of the radially inner surface 112, the radially outer surface 110, and the radial arms 114. For example, each of the multiple second sealing elements 104 may extend continuously along the web plate 36 around corners 115 of the passage 82 from the radially outer surface 110 to the radial arm 114, continuously along the web plate 36 from the radially inner surface 112 to the radial arm 114, or any combination thereof. In the present embodiment, the second sealing element 104 may be continuous and extend in a circumferential direction 76 to any fraction about the section 101, including 25%, 50%, 75%, or 100%.

Figure 6:
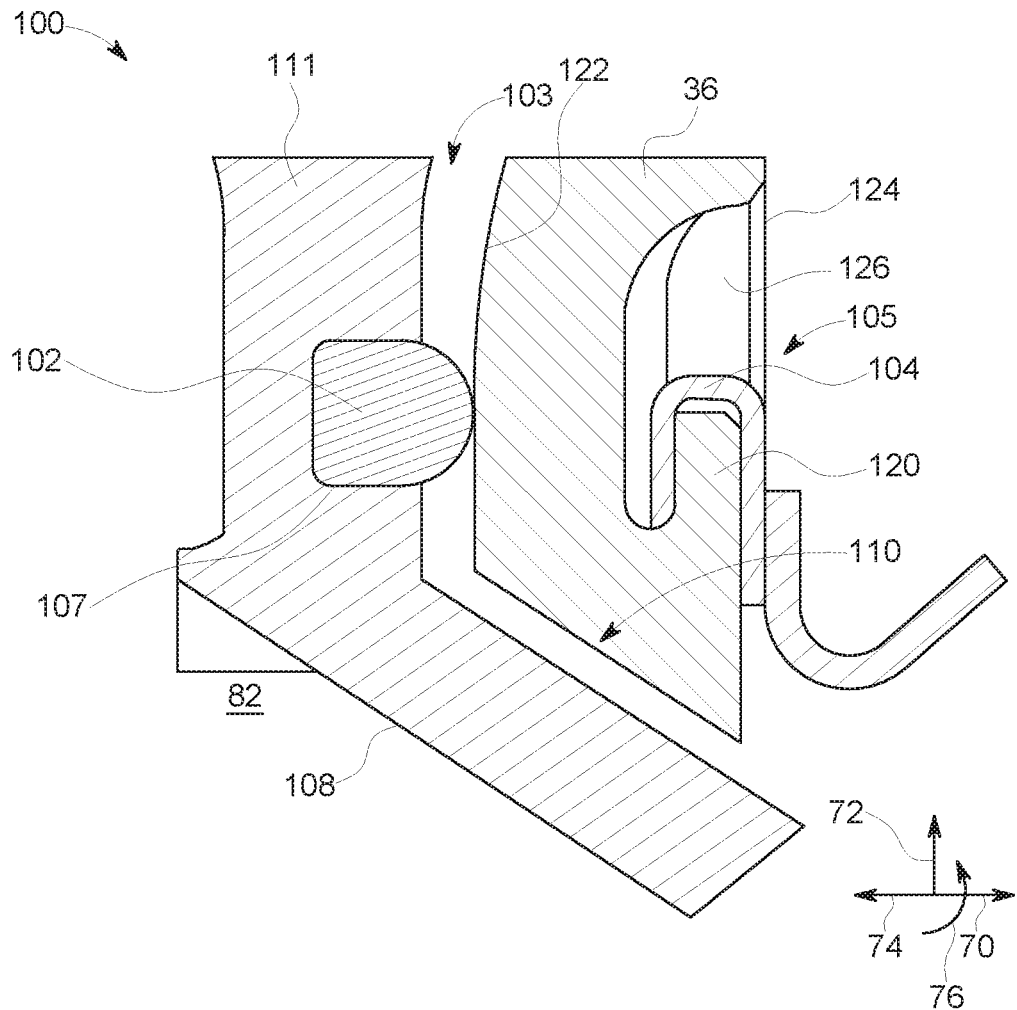
FIG. 6 is side view of an embodiment of a sealing element.

FIG. 6 is a side view of an embodiment of the seal system 100 at the radially outer surface 110 of the web plate 36 where the sealing element 102 is a rope seal. In the present embodiment, the sealing element 102 is disposed within a recess 107; however, the sealing element 102 may not be disposed within a recess 107 in alternative embodiments. The recess 107 may be disposed in a blocking plate 111, the upstream face 122 of the web plate 36, or both. The blocking plate 111 could be the same as the aft plate 106 or it could be a portion of the transition piece 32. Further, the outer flange 108 may be included on the blocking plate 111. As previously discussed, the outer flange 108 is disposed between the first sealing element 102 and the flow of combustion products 61. The first sealing element 102 may be composed of any suitable material, including metals, alloys, superalloys, ceramics, and ceramics with metallic coatings. In operation, the first sealing element 102 forms the first seal 103 by filling the area between the transition piece 32 and the web plate 36. The first sealing element 102 mechanically blocks some or all of the flow of combustion products 61 from exiting the passage 82 at the interface between the transition piece 32 and the web plate 36.

The second sealing element 104 may couple to the web plate 36 at a protrusion 120. The protrusion 120 extends into a recess 126 of the web plate 36. The recess 126 is formed in the downstream face 124 of the web plate 36. The recess 126 may contain a portion of the second sealing element 104. In the present embodiment, the second sealing element 104 hooks onto the protrusion 120, which retains the second sealing element 104 in the radial direction 72. The second sealing element 104 may couple to the web plate 36 using any suitable structure, including being held in place by friction, being welded, or being formed integrally. In some embodiments, the protrusion 120 may be located on the turbine nozzle 34 instead of the web plate 36. The second sealing element 104 forms the second seal 105 by mechanically covering the interface or gap between the web plate 36 and the turbine nozzle 34. The second sealing element 104 (e.g., cloth seal) may be formed of a flexible material, thereby enabling the second sealing element 104 to form to the interface it covers. The second sealing element 104 mechanically blocks some or all of the flow of oxidants 60 from entering the passage 82 and mixing with the combustion products 61 of the passage 82 by forming an interface between the web plate 36 and the turbine nozzle 34.

As described above, the first sealing element 102 and the second sealing element 104 may be disposed on the radially outer surface 110, the radially inner surface 112, the radial arms 114, or any combination thereof. Further, the first sealing element 102 and the second sealing element 104 may be continuous seals that extend in the circumferential direction 76 about at least a portion of the section 101, about at least a portion of the turbine axis 44, or both. In blocking the flow of combustion products 61, the first sealing element 102 and the second sealing element 104 contain the combustion products 61 flowing within the passage 82 from the transition piece 32 to the turbine nozzle 34.

Figure 7:
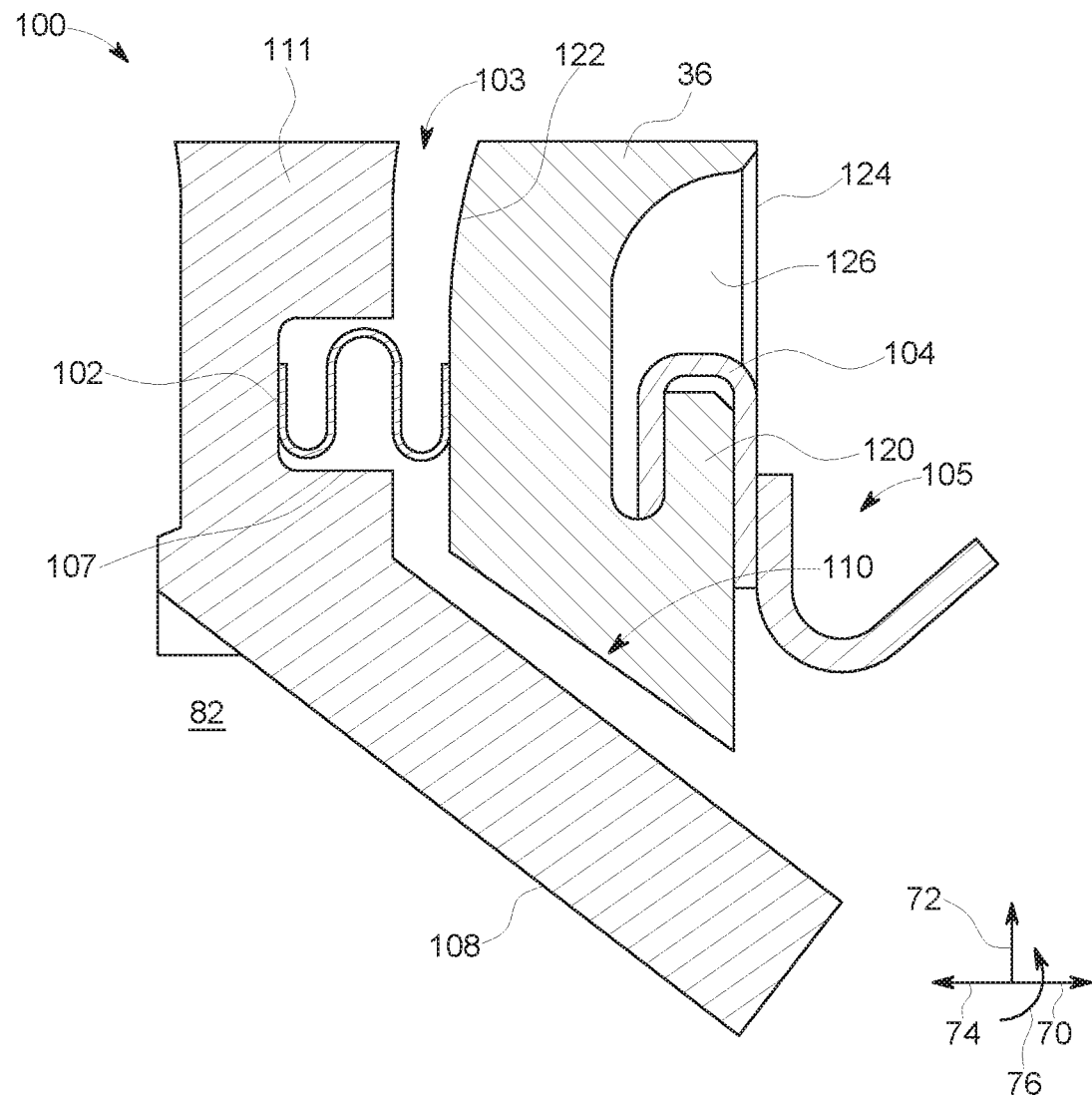
FIG. 7 is side view of an embodiment of a sealing element.
Figure 8:
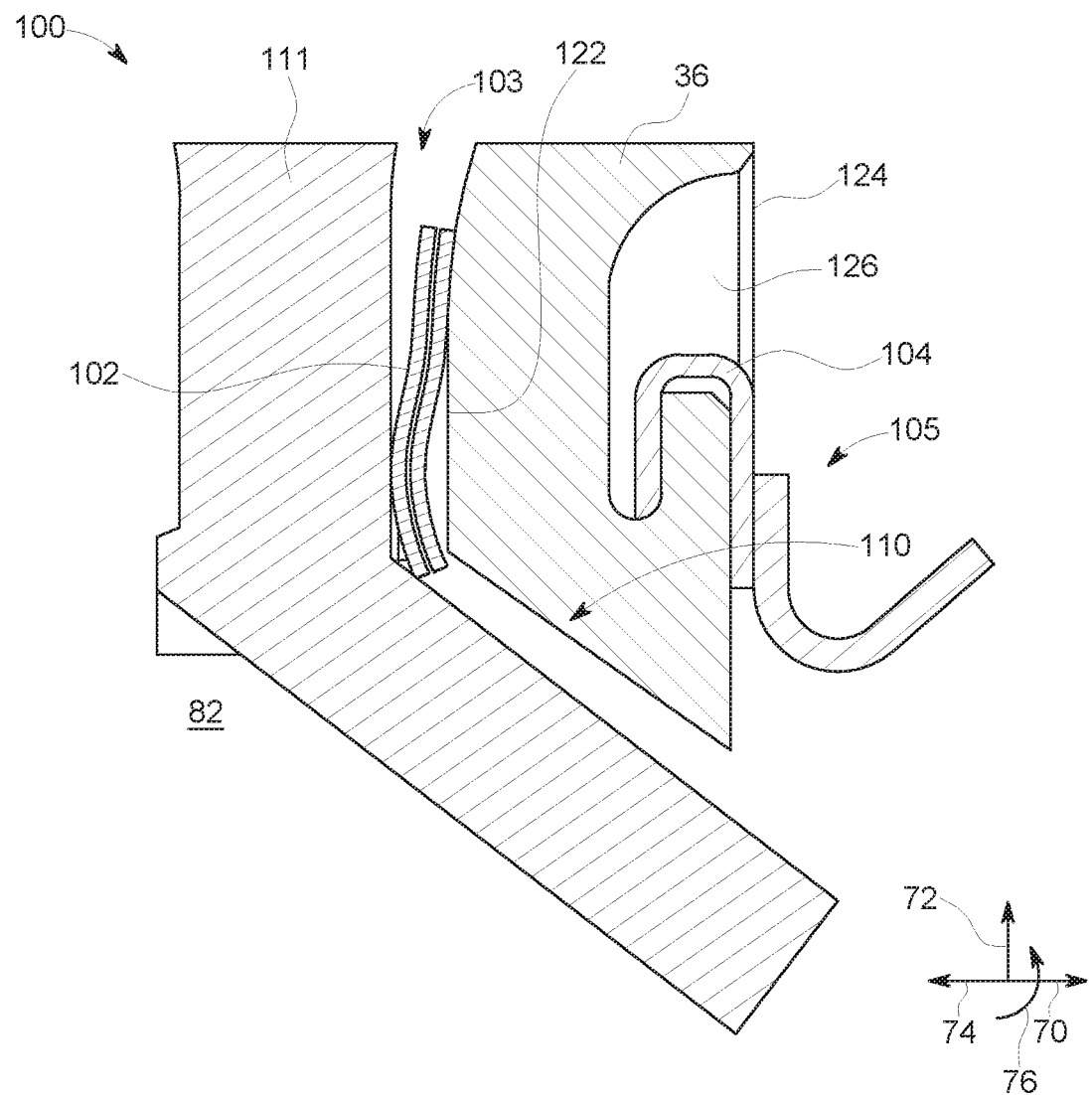
FIG. 8 is side view of an embodiment of a sealing element.
Figure 9:
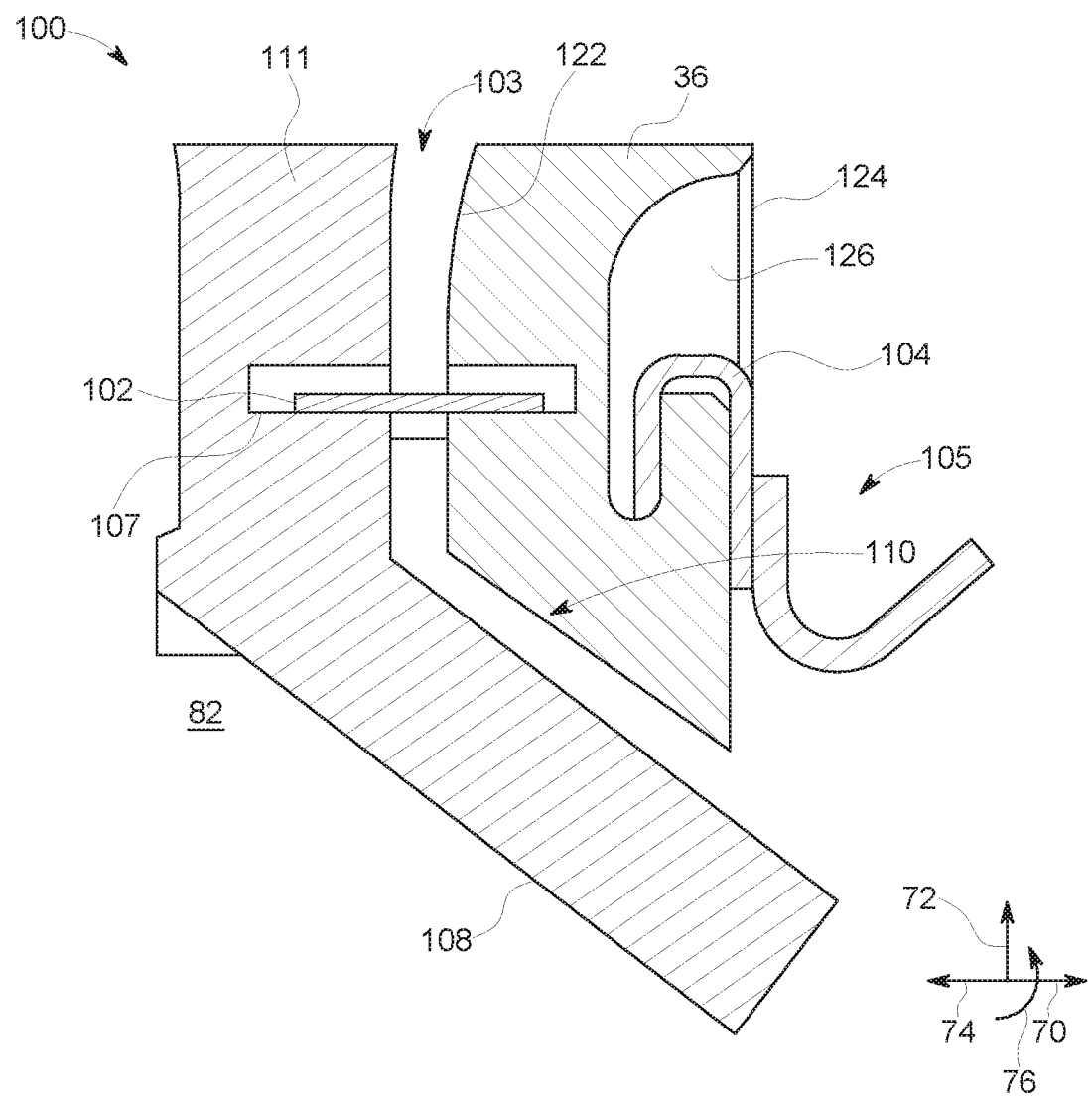
FIG. 9 is side view of an embodiment of a sealing element.

FIGS. 7 through 9 depict different embodiments of the seal system 100 at the radially outer surface 110 of the web plate 36. FIG. 7 includes an embodiment where the first sealing element 102 is a bellow seal. A bellow seal is a mechanical seal with a sinusoidal cross-section that expands in either the downstream direction 70 or the upstream direction 74 to fill the space in which it is disposed. In the present embodiment, the bellow seal is disposed in the recess 107. The recess 107 retains the bellow seal in its desired location.

FIG. 8 includes an embodiment where the first sealing element 102 is a hula seal. The hula seal is a flexible mechanical seal that expands in the radial direction 72. The cross-section of the hula seal becomes flatter as the hula seal expands. FIG. 8 depicts a configuration without the recess 107. The hula seal is biased to exert a force against both the blocking plate 111 and the web plate 36. Friction caused, at least partially, by this exerted force is sufficient to maintain the position of the hula seal. Further, the hula seal may be composed of alternating layers of ceramics and metallics. In some embodiments, the first sealing element 102 may be axially disposed between the web plate 36 and the blocking plate 111 (e.g., transition piece 32, aft plate 106). In these embodiment, the position of the first sealing element is not maintained by the recess 107.

FIG. 9 includes an embodiment where the first sealing element 102 is a spline seal. In the present embodiment, the spline seal is disposed within recesses 107 on opposing sides of the blocking plate 111 and the web plate 36, and the spline seal is substantially parallel to the flow of the combustion products 61 through the passage 82. However, the recesses 107 may be disposed within only the blocking plate 111 or only within the web plate 36. Further, the recesses 107 may be offset from one another, causing the spline seal to be positioned at an angle relative to the flow of the combustion products 61 through the passage 82. The spline seal may include, but is not limited to, pins, bars, sheets, rings, plates, or layers of cloth or shims. In the present embodiment, the spline seal has a quadrilateral cross-section, but alternative spline seals may have a curved cross-section. Further, the position of the spline seal may be maintained by friction, thermal expansion, or bias forces.

Figure 10:
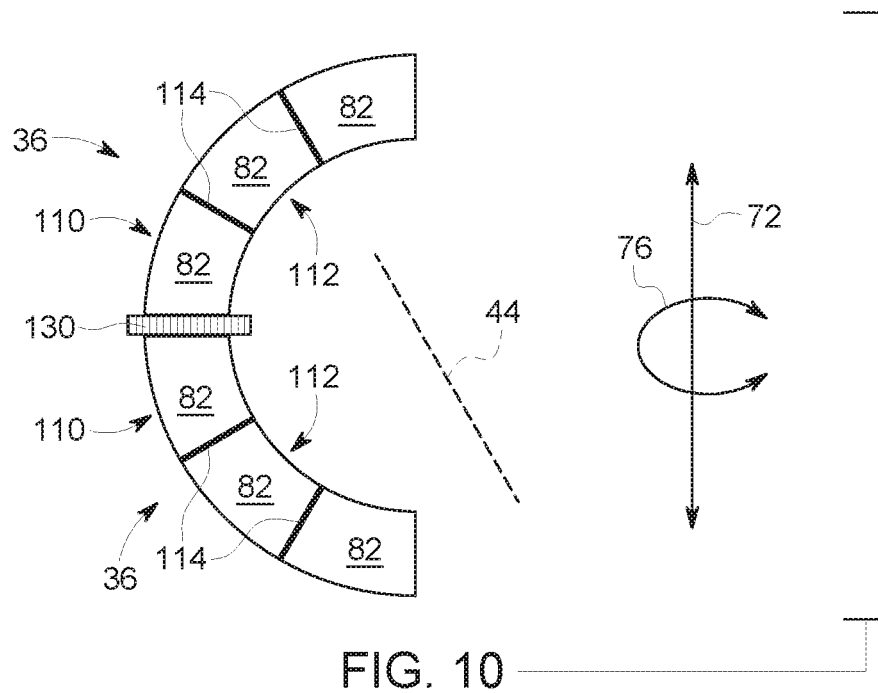
FIG. 10 is a front view of multiple web plates.

FIG. 10 is a front view of multiple web plates 36 with an inner segment sealing element 130 disposed at the interface of the two web plates 36. Each of the two web plates 36 has inner radial surfaces 112, outer radial surfaces 110, and radial arms 114. Further, each of the web plates 36 has multiple passages 82. Each of the web plates 36, as illustrated, extend a similar percentage about the turbine axis 44 in the circumferential direction 76; however, it should be appreciated that adjacent web plates 36 may extend different percentages about the turbine axis 44. Disposed at the interface of the two web plates 36 is an inner segment sealing element 130. The inner segment sealing element 130 is disposed on radial arms 114 of adjacent web plates 36. The inner segment sealing element 130 may partially or fully block oxidant 60 from leaking between adjacent web plates 36. The inner segment sealing element 130 may be any suitable seal, such as the w-seal, bellow seal, rope seal, or spline seal as described above. Further, the inner segment sealing element 130 may be longer than the radial arms 114 and extend passed either the inner radial surface 112, the outer radial surface 110, or both.

Figure 11:
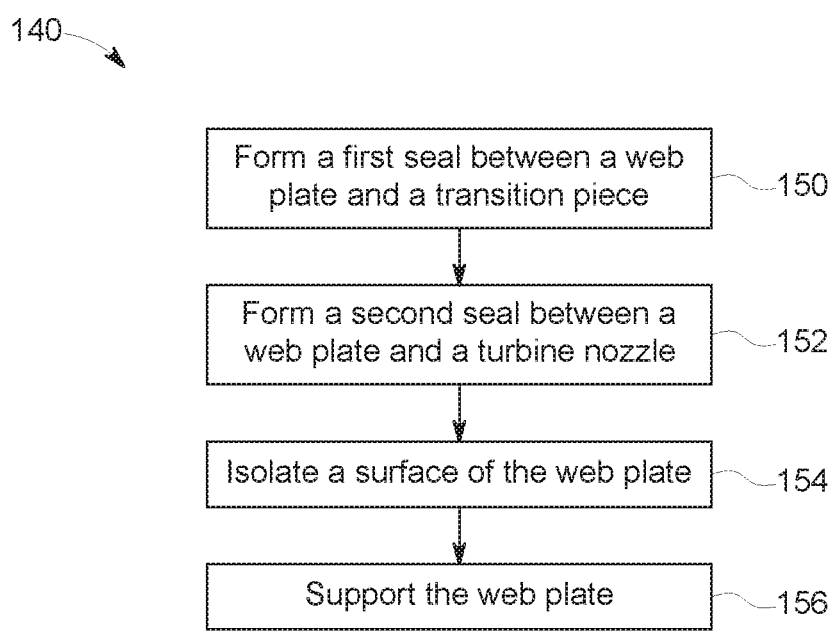
FIG. 11 is a flow chart depicting an embodiment of a method for forming seals with the web plate.

FIG. 11 is a flow chart illustrating an embodiment of a method 140 to seal the interface between the transition piece 32 and the web plate 36, and between the turbine nozzle 34 and the web plate 36. Although the following method 140 describes a number of operations that may be performed, it should be noted that the method 140 may be performed in a variety of suitable orders. All of the operations of the method 140 may not be performed.

The method 140 includes forming (block 150) the first seal 103 between the web plate 36 and the transition piece 32. The first seal 103 may be formed by the first sealing element 102. The first sealing element 102 extends around the passage 82 that is configured to receive the combustion products 61. Then, forming (block 152) the second seal 105 between the web plate 36 and the turbine nozzle 34. The second seal 105 may be formed by the second sealing element 104. The second sealing element 104 extends around the passage 82 that is configured to receive the combustion products 62. Further, it should be appreciated that both the first sealing element 102 and the second sealing element 104 may extend around any suitable portion of the passage 82, including 25%, 50%, 75%, or 100%. Moreover, at least one of the first sealing element 102 and the second sealing element 104 may be a continuous seal as previously described. Further, it should be appreciated that the first sealing element 102 and the second sealing element 104 could be any type of seal as previously described, including a bellow seal, a w-seal, a rope seal, a hula seal, a spline seal, a cloth seal, a laminated cloth seal, or a leaf seal.

Then, the method 140 includes isolating (block 154) any combination of the radially inner surface 112, the radially outer surface 110, or the radial arms 114 of the web plate 36 from the combustion products 61. As discussed previously, the outer flange 108 and the inner flange 109 of the transition piece 32 isolate the web plate 36 from the flow of the combustion products 61. The outer flange 108 and the inner flange 109 are disposed radially between the web plate 36 and the interior of the passage 82. Further, the web plate 36 may also be isolated from the combustion products 61 by the aft plate 106. Then, the method 140 may also include supporting (block 156) the web plate 36. The web plate 36 may be supported by a web plate support 116. As previously discussed, the web plate support 116 may also support the transition piece 32, the turbine nozzle 34, or both the transition piece 32 and the turbine nozzle 34. Alternatively, the transition piece 32 may be supported by a different first support 117. The turbine nozzle 34 may be supported by a different second support 119.

Using the presently disclosed embodiment grants a number of benefits to the system efficiency. Oxidant 60 leakage between the transition piece 32 and the turbine nozzle 34 is greatly reduced. Further, the seal system 100 remains effective even when the seal system 100 is misaligned during assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
    a transition piece configured to receive combustion products from a combustion chamber wherein the transition piece is coupled to a first support of the system;
    a turbine nozzle configured to receive the combustion products from the transition piece wherein the turbine nozzle is coupled to a second support of the system;
    a web plate extending in a circumferential direction about a turbine axis between the transition piece and the turbine nozzle, wherein the web plate is configured to form a first seal, via a first sealing element, between the web plate and the transition piece, the web plate is configured to form a second seal, via a second sealing element, between the web plate and the turbine nozzle, the web plate is coupled to a third support of the system, and the web plate comprises an inner surface extending in the circumferential direction, an outer surface extending in the circumferential direction, and an arm extending in a radial direction between the inner surface and the outer surface; and
    a passage configured to facilitate a flow of the combustion products through the transition piece, the web plate, and the turbine nozzle, wherein the transition piece comprises an inner flange disposed radially between the inner surface of the web plate and the combustion products flowing through the passage, an outer flange disposed radially between the outer surface of the web plate and the combustion products flowing through the passage, and a radial flange disposed between the arm and the combustion products flowing through the passage, and wherein the transition piece extends further upstream and downstream with respect to the flow of the combustion products than the inner surface, the outer surface, and the arm.

2. The system of claim 1, wherein the web plate extends twenty-five percent or more in the circumferential direction about the turbine axis.

3. The system of claim 1, wherein the web plate extends fifty percent or more in the circumferential direction about the turbine axis.

4. The system of claim 1, wherein the web plate extends in the circumferential direction between a plurality of transition pieces and a corresponding plurality of turbine nozzles.

5. The system of claim 1, wherein at least one of the first sealing element and the second sealing element comprises a continuous seal extending along the arm, a first segment of the inner surface, and a second segment of the outer surface.

6. The system of claim 1, wherein the first sealing element comprises a bellow seal, a rope seal, a w-seal, a hula seal, or a spline seal.

7. The system of claim 1, wherein the second sealing element comprises a cloth seal, a laminated cloth seal, or a leaf seal.

8. The system of claim 1, wherein the third support comprises at least one of the first support and the second support.

9. A system comprising:
    a transition piece; and
    a first web plate configured to be disposed radially about a turbine axis between the transition piece and a turbine nozzle, wherein the first web plate comprises:
        an inner surface that extends in a circumferential direction about the turbine axis;
        an outer surface that extends in the circumferential direction about the turbine axis;
        a first arm extending in a radial direction between the inner surface and the outer surface; and
        a second arm extending in the radial direction between the inner surface and the outer surface, wherein the inner surface, the outer surface, the first arm, and the second arm are configured to form a passage between the transition piece and the turbine nozzle, wherein the first web plate is configured to form a first seal, via a first sealing element, between the first web plate and the transition piece, the first web plate is configured to form a second seal, via a second sealing element, between the first web plate and the turbine nozzle, and the passage is configured to facilitate a flow of combustion products from the transition piece, through the first web plate, to the turbine nozzle, wherein the transition piece comprises an inner flange disposed radially between the inner surface of the first web plate and the combustion products flowing through the passage, an outer flange disposed radially between the outer surface of the first web plate and the combustion products flowing through the passage, and a radial flange disposed between the first arm and the combustion products flowing through the passage, and wherein the transition piece extends further upstream and downstream with respect to the flow of the combustion products than the inner surface, the outer surface, and the first arm.

10. The system of claim 9, wherein the first sealing element comprises a continuous seal extending along the first arm, the second arm, the inner surface, and the outer surface.

11. The system of claim 9, wherein the first web plate extends 25 percent or more in the circumferential direction about the turbine axis.

12. The system of claim 9, comprising the turbine nozzle, wherein the transition piece is coupled to a first support of the system, the turbine nozzle is coupled to a second support of the system, and the first web plate is coupled to the first support or to the second support.

13. The system of claim 9, comprising the turbine nozzle, wherein the transition piece is coupled to a first support of the system, the turbine nozzle is coupled to a second support of the system, and the first web plate is coupled to a third support that is different from the first support and the second support.

14. The system of claim 9, wherein the second sealing element comprises a cloth seal, a laminated cloth seal, or a leaf seal.

15. The system of claim 9, wherein the first web plate is adjacent to a second web plate and wherein an inner segment sealing element is disposed between the first web plate and the second web plate.

16. A method, comprising:
forming a first seal, via a first sealing element, between a web plate and a transition piece, wherein the first seal extends around a passage configured to facilitate a flow of combustion products through the transition piece, the web plate, and a turbine nozzle; and
forming a second seal, via a second sealing element, between the web plate and a turbine nozzle, wherein the second seal extends about the passage;
wherein the web plate comprises an inner surface extending in a circumferential direction about a turbine axis, an outer surface extending in the circumferential direction about the turbine axis, and an arm extending in a radial direction between the inner surface and the outer surface; and
wherein the transition piece comprises an inner flange disposed radially between the inner surface of the web plate and the combustion products flowing through the passage, an outer flange disposed radially between the outer surface of the web plate and the combustion products flowing through the passage, and a radial flange disposed between the arm of the web plate and the combustion products flowing through the passage, and wherein the transition piece extends further upstream and downstream with respect to the flow of the combustion products than the inner surface, the outer surface, and the arm.

17. The method of claim 16, comprising isolating a surface of the web plate from the combustion products via an axial extension of the transition piece, wherein the axial extension is disposed radially between the web plate and an interior of the passage, and wherein the axial extension comprises the inner flange, the outer flange, the radial flange, or a combination thereof.

18. The method of claim 16, comprising coupling the web plate to a support, wherein the support is coupled to the turbine nozzle, to the transition piece, or any combination thereof.

19. The system of claim 1, wherein the first sealing element is disposed axially between the transition piece and the web plate, and wherein the first sealing element is disposed on an upstream face, relative to the flow of the combustion products, of the web plate.

20. The system of claim 1, wherein the inner flange, the outer flange, and the radial flange are integral with the transition piece.

* * * * *